United States Patent [19]

Nelson et al.

[11] 4,241,531
[45] Dec. 30, 1980

[54] MOUSE TRAP

[76] Inventors: Alfred O. Nelson; Betty Jo Nelson, both of Rte. #1 Reed Point, Mont. 59069

[21] Appl. No.: 16,317
[22] Filed: Feb. 28, 1979
[51] Int. Cl.³ ............................................ A01M 23/04
[52] U.S. Cl. ......................................................... 43/69
[58] Field of Search ............................................. 43/69

[56] References Cited

U.S. PATENT DOCUMENTS

| | | |
|---|---|---|
| 271,952 | 2/1883 | Turley ........................................ 43/69 |
| 506,951 | 10/1893 | Stephens .................................. 43/69 |
| 596,990 | 1/1898 | Frampton ................................. 43/69 |
| 639,246 | 12/1899 | Kagarier .................................. 43/69 |
| 942,069 | 12/1909 | Hess ........................................ 43/69 |
| 995,233 | 6/1911 | Elder ....................................... 43/69 |
| 1,084,071 | 1/1914 | Darling ................................... 43/69 |
| 1,185,452 | 5/1916 | Tucker .................................... 43/69 |
| 1,228,324 | 5/1917 | Vascen .................................... 43/69 |
| 1,578,080 | 3/1926 | Dewey ..................................... 43/69 |
| 2,218,403 | 10/1940 | McKee .................................... 43/69 |

FOREIGN PATENT DOCUMENTS

| | | | |
|---|---|---|---|
| 768378 | 10/1967 | Canada ........................................ 43/69 |
| 363401 | 11/1922 | Fed. Rep. of Germany .............. 43/69 |
| 432442 | 8/1926 | Fed. Rep. of Germany .............. 43/69 |
| 870778 | 3/1953 | Fed. Rep. of Germany .............. 43/69 |
| 354725 | 12/1937 | Italy ........................................... 43/69 |

Primary Examiner—Nicholas P. Godici
Assistant Examiner—J. T. Zatarga
Attorney, Agent, or Firm—Merchant, Gould, Smith, Edell, Welter & Schmidt

[57] ABSTRACT

An animal trap of the type which precipitates an animal into a disposal chamber (12) through a disposal opening (40), characterized by having a pyramidal bait chamber (11), with an entrance (32) and non-grip internal surfaces, around the disposal opening (40), and a pivoted shutter (42) that normally closes the disposal opening (40), but is actuated by the weight of the animal to not only unclose the disposal opening (40), but also close the entrance (32).

1 Claim, 7 Drawing Figures

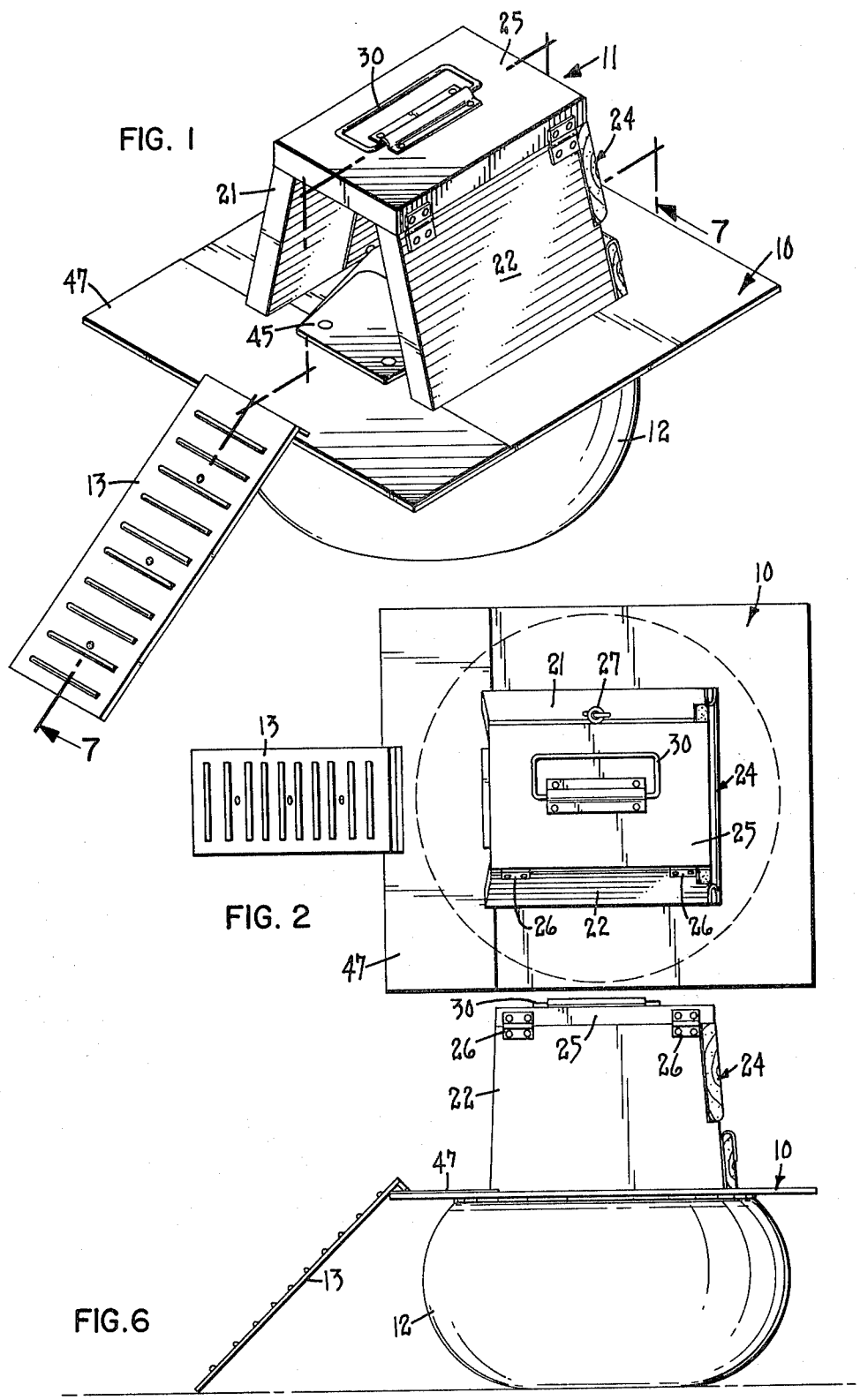

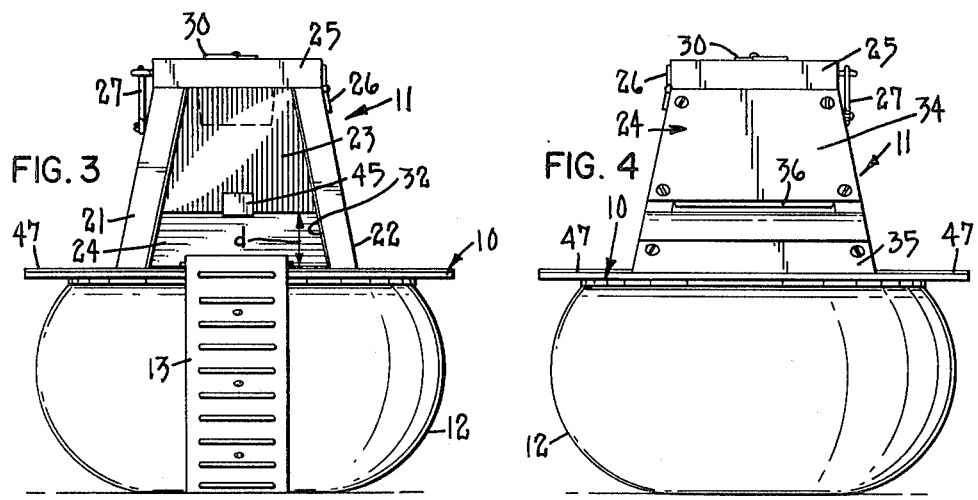
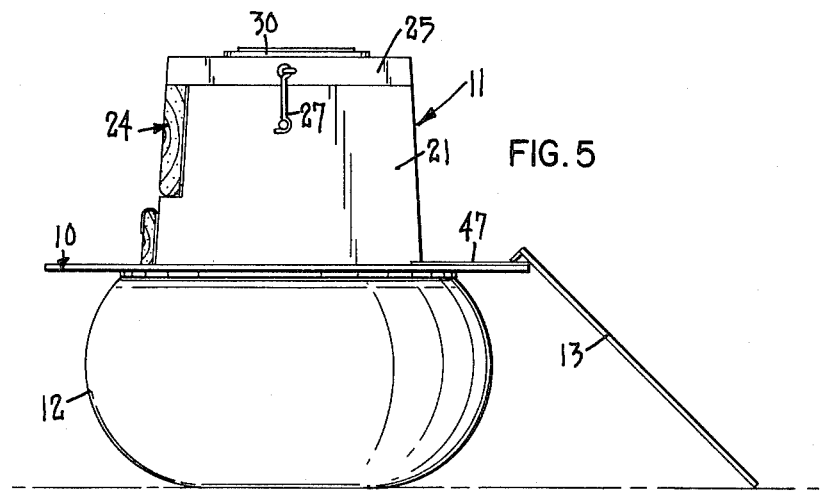
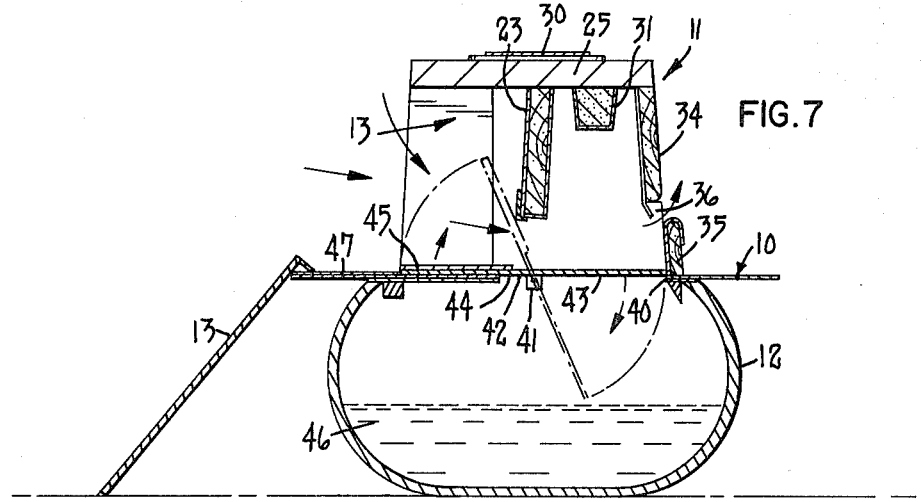

MOUSE TRAP

This invention relates to the field of rodent traps, and specifically to an improved trap in which the weight of a rodent approaching a bait is sufficient to open a trap door or shutter and precipitate the rodent into a closed disposal chamber below, the shutter thereafter returning to its original position. If desired, the chamber may contain a liquid in which the rodent quickly drowns.

BACKGROUND OF THE INVENTION

The general idea of eradicating animal pests in this fashion is not new, and is taught for example in Wojcik U.S. Pat. No. 1,353,882 and numerous latter patents. Rodents are not unintelligent, and have strong survivial instincts and rapid reaction times. To be successful a trap of this kind must operate quickly, with little physical forwarning, must be constructed to provide no alternative egress path for the rodent, and should operate with so little noise as not to frighten away nearby rodents while a first is being entrapped.

SUMMARY OF THE INVENTION

The present invention is characterized by a bait chamber the walls of which converge upwardly so that once the shutter starts to operate there is no surface available to the rodent to prevent his fall. Furthermore, the shutter is centrally pivoted and is arranged so that as one end lowers under the rodent, the other end rises to close the entrance through which the rodent gained access to the bait chamber.

Various advantages and features of novelty which characterize our invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWING

In the drawing, FIG. 1 is a perspective view of a mousetrap embodying the invention (for trapping other animals such as rats or squirrels dimensions and so forth may be suitably modified);

FIG. 2 is a plan view of the structure of FIG. 1;

FIG. 3 is a front elevation of the structure of FIG. 2;

FIG. 4 is a rear elevation of the structure of FIG. 2;

FIGS. 5 and 6 are elevations from the left and right respectively; and

FIG. 7 is a sectional view along the lines 7—7 of FIG. 1.

DESCRIPTION OF THE PREFERRED EMBODIMENT

A trap according to my invention comprises a platform 10 supporting a bait chamber 11 and resting on a disposal chamber 12: access to platform 10 by mice is provided by a ramp 13.

Chamber 11 tapers upwardly and is constructed of first and second opposite tapering sides 21 and 22, a third side 23, a fourth side 24 opposite side 23, and a top 25 movably secured to side 22 by hinges 26, and to side 23 by a fastener 27. Top 25 may be provided with a carrying handle 30, and a bait carrier 31 of any desired sort is secured to the under surface of top 25.

Side 23 of chamber 11 is open for a distance d above platform 10, to provide an entrance 32 to the chamber. Sides 21 and 22 and top 25 extend outward beyond side 23 to comprises an open ended approach 33 to entrance 32.

Side 24 is constructed of an upper portion 34 and a lower portion 35 separated to provide a slot 36. This enables circulation of air through bait chamber 11, to spread the aroma of bait in the environment, and to increase with willingness of a rodent to enter the bait chamber, since rodents are somewhat reluctant to enter closed spaces. Slot 36 is not wide enough, however, to permit the escape of a rodent therethrough. The inner surfaces of bait chamber 11 are smoothly covered with metal.

A large opening 40 is provided in the middle of platform 10, and a shaft 41 extends across aperture 40 near the end thereof adjacent to entrance 32. A shutter 42 is pivoted on shaft 41, and has first and second portions 43 and 44 extending in opposite directions from the shaft. The shutter moves between first and second extreme positions shown in FIG. 7 in solid and broken lines respectively. In the first position portion 43 closes opening 40 and portion 44 overlies platform 10: in the second position portion 44 engages wall 23 at a bumper 48 to close entrance 32, and portion 43 is tilted steeply downward from shaft 41. The shutter is preferably made of metal on which the rodent's feet can take no purchase. A layer of suitable thin material such as plywood is applied to the upper surface of portion 44 to act as a counterweight 45, so that shutter 42 is normally maintained firmly in its first position, but the arrangement is such that when a mouse advances over counterweight 45 and onto portion 43 its weight is sufficient to overcome counterweight 45, and the shutter tilts quickly to its second position.

If desired, disposal chamber 12 may be filled with a liquid 46 such as crankcase oil or water, with antifreeze if necessary, to a level just below the lower limit of travel of portion 43 of shutter 42. Preferably the rim of chamber 12 is inturned and platform 10 covers the open end of chamber 12 completely, to prevent all egress therefrom.

As a practical matter shutter 42 is most conveniently made of metal, although ramp 13, platform 10, and chamber 11 may be of less expensive material, such as wood, except for the nongrip lining of the bait chamber. A rodent approaching bait holder 31 would encounter wooden footing until it reaches the inner end of counterweight 45, where the footing would change to metal. This change of footing is enough to prevent some rodents from taking the few further steps toward the bait holder, and they abandon the bait at this point. We have found that if the edge of platform 10 nearest ramp 13 and aperture 33 is overlaid by a strip 47 of like metal, which is not in a confined space and can safely be investigated, the rodents are thereafter less affected by a second change of footing as they step off counterweight 45. We have also found that shutter 42 and strip 46 should be coated with paint to prevent the rodents from being kept away by high or low temperatures conducted to their sensitive feet in summer or winter.

OPERATION

To use the rodent trap, disposal chamber 12 is filled with a desired liquid to a desired level, if the rodents are to be disposed of by drowning. Fastener 27 is undone, top 25 is opened, and bait is placed in holder 31 after which top 25 is again secured. Since the rodents do not actually reach holder 31, replacement of bait is seldom needed. The disposal chamber is placed in a desired location, the assembly of platform 10 and bait chamber 11 is positioned thereon to entirely cover the rim of chamber 12, and when ramp 13 is positioned to give access to platform 10, the trap is set.

The aroma of the bait pervades the environment, aided by air circulation suggested by the solid arrows in FIG. 7. When a hungry rodent detects the bait he mounts ramp 13, crosses strip 47, enters approach 33, and crosses counterweight 45, to pass through entrance 32 under wall 23. As he moves about the bait chamber attempting to reach the bait, his weight overcomes counterweight 45, and the shutter moves gravitationally from its first to its second position, as suggested by the broken arrow in FIG. 7. depriving the rodent of support. The movement of the shutter is not instaneous. The rodent can sense this movement, be alarmed thereby, and attempt to retrace its steps or to cling to shutter 42 or the walls of bait chamber 11. The outward angulation of the walls and their metal linings, as well as the metallic nature of shutter 42, give the rodent little purchase to accelerate his attempted departure, and portion 44 of the shutter quickly closes entrance 32 to such an extent that egress is no longer possible there. The rodent must drop into the disposal chamber 12 for destruction. Counterweight 45 now returns shutter 42 to its first position, and the trap is immediately ready to receive and dispose of another rodent: the operation of the trap is free from loud snaps or other sounds tending to frighten other rodents away. It is only necessary that the owner of the trap ocassionally empty the disposal container and recharge it with liquid as desired: the bait can be renewed at the same time.

Actual experience with this trap over a single 14 day period resulted in the trapping of 99 mice.

From the foregoing it will be evident that we have invented a new mousetrap characterized by a tapering bait chamber structure, a plurality of nongrip surfaces, and a shutter that not only opens a disposal aperture but closes the normal access opening, to prevent rodent egress.

Numerous characteristics and advantages of our invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

What is claimed is:

1. An animal trap comprising, in combination:

a container of liquid;

a platform over said container having a central opening;

an upwardly converging bait chamber around said opening including first and second opposite inperforate walls, a closed top, a third wall open for a predetermined distance above said platform as a low entrance to said chamber, and a fourth wall opposite said third wall and having a slot to enable circulation of air from said entrance through said chamber, said first and second walls and said top extending beyond said third wall to comprise an open-ended approach to said entrance, and said entrance not being narrow enough to prevent a rodent from turning therein;

a shutter;

means movably mounting said shutter at said opening for pivotal movement about a horizontal axis from a first position, in which a first portion of said shutter closes said opening and a second portion of said shutter overlies said platform to comprise an entrance floor for said chamber, and a second position, in which said first portion of said shutter slopes downwardly to unclose said opening and said second portion slopes upwardly to contact the lower edge of said third wall and close said entrance, at least the inner surface of the said walls and said shutter being of material on which animal claws can find no purchase;

means normally maintaining said shutter in said first position in the absence of additional weight on the surface of said first portion thereof;

means for securing bait within said chamber above said opening and said first portion of said shutter; and bumper means for muffling the sound of operation of said shutter into said second position.

* * * * *